United States Patent
Hepler

(10) Patent No.: US 9,302,416 B1
(45) Date of Patent: Apr. 5, 2016

(54) SINGLE NOZZLE VALVE GATE

(71) Applicant: POLYSHOT CORPORATION, West Henrietta, NY (US)

(72) Inventor: Douglas C Hepler, Rochester, NY (US)

(73) Assignee: POLYSHOT CORPORATION, West Henrietta, NY (US)

( * ) Notice: Subject to any disclaimer, the term of this patent is extended or adjusted under 35 U.S.C. 154(b) by 0 days.

(21) Appl. No.: 14/509,148

(22) Filed: Oct. 8, 2014

(51) Int. Cl.
*B29C 45/23* (2006.01)
*B29C 45/74* (2006.01)
*B29C 45/28* (2006.01)

(52) U.S. Cl.
CPC .............. *B29C 45/231* (2013.01); *B29C 45/74* (2013.01); *B29C 45/2806* (2013.01)

(58) Field of Classification Search
CPC ................................................... B29C 45/2806
USPC ................................................... 425/562, 564
See application file for complete search history.

(56) References Cited

U.S. PATENT DOCUMENTS

| 5,553,882 | A | 9/1996 | Unruh |
| 6,086,356 | A | 7/2000 | Yu |
| 6,159,000 | A | 12/2000 | Puri et al. |
| 6,238,203 | B1 * | 5/2001 | Koh .................. B29C 45/27 425/562 |
| 6,419,116 | B1 * | 7/2002 | Eigler ................ B29C 45/2806 425/564 |
| 7,014,455 | B2 * | 3/2006 | Olaru .................... B29C 45/281 425/564 |
| 7,029,269 | B2 | 4/2006 | Babim et al. |
| 7,125,242 | B2 * | 10/2006 | Dewar ............... B29C 45/2758 425/542 |

* cited by examiner

Primary Examiner — Tim Heitbrink
(74) Attorney, Agent, or Firm — Francis J. Caufield

(57) ABSTRACT

An in-line single nozzle valve gate apparatus for injection molding comprises upper and lower matable annular cylinder bodies that house an annular dual sided piston having opposed pressure bearing upper and lower surfaces. The piston has a cross beam to which a valve gate pin is attached for movement therewith. The valve gate pin passes through a sprue bushing flow path to selectively open and close a part cavity gate. An interface is provided to receive molten plastic from the injection machine nozzle and pass it into the sprue bushing flow path. The cylinder bodies reside largely outside of the mold plate architecture to lessen thermal damage too piston seals.

8 Claims, 4 Drawing Sheets

SINGLE NOZZLE VALVE GATE

FIELD OF THE INVENTION

This invention in general relates to plastic injection molding technology and, more particularly, to the structure of an in-line single injection molding nozzle having a selectively actuable valve gate to regulate the flow of molten plastic into a mold cavity.

BACKGROUND OF THE INVENTION

Injection molding is a well-known process for producing parts from both thermoplastic and thermosetting plastic materials. In the process, plastic material is fed into a heated barrel to become molten, mixed, and then forced under pressure via flow paths into a mold cavity whose shape complements the shape of the final part. Afterwards, the cavity is cooled causing the plastic to harden as the final part. The mold is then opened, and the part removed along with any hardened plastic that may remain in the flow channels upstream of the part cavity.

Molding architectures generally involve the use of a series of mating plates for delivering and distributing the molten plastic to one or more cavities. The plates are held together against one another by a hydraulic clamping arrangement during the molding cycle. The clamping arrangement typically utilizes a fixed plate on one end of the mold plate stack and a moveable plate that travels between open and closed positions during the mold cycle. The amount of force required to maintain mold plates in contact with one another during the injection portion of the cycle is referred to as the clamping force and can be considerable, usually measured in tons.

In many molding architectures, melt flows in a more or less straight line from the injector nozzle to the gate of the part cavity. In such in-line configurations, use is often made of a valve gate pin to open and close the cavity gate to regulate flow into the cavity.

Various methods and mechanisms of varying complexity have been used to selectively control the actuation of in-line valve gate pins. All require the application of considerable force to the pin for proper control of the gate. In addition, any design must manage the thermal environment of the mold architecture and be sensitive to the possibility of deleterious effects caused by the presence of high heat generated by components along the flow path, including heat sources found in the various plates typically employed.

In many instances, use has been made of pneumatic reciprocating pistons to move the pin between open and closed positions. Such approaches have placed mechanisms proximate the in-line flow path, more or less residing within the plate arrangement, thus resulting in complex architectures and heat management concerns.

For example, use has been made of small pistons whose sealing O-rings are in direct contact with heated flow steel. In another approach, a piston was placed in the top clamp plate to keep it more or less cool by placing it remotely from down stream heaters. Another approach placed the entire actuating mechanism above the locating ring and employed a small piston, but subjected O-rings to deleterious heat.

Other approaches have located the actuating mechanism out of the direct in-line flow path. For example, external pistons have been used to drive a cam to move the pin. Another has the piston displaced with respect to the in-line path using a rocker arm extending into the in-line path to move the pin. Another out of line approach used a motor driven spline shaft to drive a rack in the pin.

While many approaches have been used for in-line valve gate actuators, a need still exists for a solution that addresses various unsolved problems.

Consequently, it is a principle object of this invention to provide improved in-line valve gate pin actuation.

It is still another object of the present invention to provide high pin force for in-line valve gate actuation.

It is yet another object of the present invention to provide in-line valve gate actuation mechanisms that are compact, simple, and reliable.

It is another object of the present invention to provide in-line valve gate actuators that can process most highly filled and unfilled commodity resins.

It is yet another object of the present invention to provide a pneumatic actuating cylinder within an integrated mold locating ring to lessen deleterious thermal effects on piston seals.

It is still another object of the present invention to provide valve gate actuators that move with in-line action to reduce wear.

It is yet another object of the present invention to provide in-line valve gate actuation with the ability to easily change nozzles to accommodate a variety of applications.

Other objects of the invention will, in part, be obvious, and will, in part, appear hereinafter when the following detailed description is read in connection with the accompanying drawings.

SUMMARY OF THE INVENTION

This invention generally relates to injection molding technology, and particularly, to the design of an in-line single nozzle valve gate apparatus. The apparatus comprises upper and lower matable annular cylinder bodies structured to receive an annular dual sided piston having opposed pressure bearing upper and lower surfaces. When mated, the inner surfaces of the upper and lower cylinder bodies define a central through-hole accessible through an annular circumferential slot formed between the inner surfaces of the mated upper and lower annular cylinder bodies. Extending through the annular slot is a cross beam that forms a bridge between the inner surfaces of the piston, approximately midway between its opposed upper and lower pressure bearing surfaces.

Extending through the cylinder central through-hole is an injection machine interface. The injection machine interface has the general from of a cylinder. The top of the interface cylinder is provided with a spherical cap sealing surface to mate with the injection machine nozzle from which it receives pressurized molten plastic. The bottom of the interface cylinder is provided with a centrally located groove that extends vertically to provide space for receiving the cross beam so that it can move up and down within the groove.

The machine interface sealing surface has at least one, but preferably two, flow paths that are angled so as to simultaneously extend outwardly and downwardly to travel around the cross beam groove where they terminate as spaced apart holes in the bottom surface of the interface.

The apparatus also has a heated sprue bushing having an elongated body provided with a central flow path. The body has a head section that has two angled flow paths that mate with the two flow paths in the bottom surface of the injection machine interface. Molten pressurized plastic is received in the sprue bushing flow paths to enter the sprue bushing's central flow path at the end of which is a removable tip having a flow aperture that mates with the cavity gate.

Extending vertically trough the sprue bushing central flow path is a valve gate pin having an upper end connected to the piston cross beam and a lower end configured to open and close the cavity gate to regulate the flow of molten plastic to the part cavity.

The annular piston and upper and lower annular cylinder bodies are configured and arranged with respect to another so that head spaces are formed between the piston's upper and lower pressure bearing surfaces and corresponding upper and lower internal pressure bearing surfaces located, respectively, in the upper and lower annular cylinder bodies. The head spaces are provided with seals in the form of o-rings. Ports connected to pressurized air sources (or other suitable fluid) are provided to controllably cause the annular piston to move up and down so that the valve gate pin opens and closes the cavity gate.

The geometry of the upper cylinder body is shaped to act as the locating ring for the system to align its various parts with the nozzle of the injection molding machine while also permitting the annular dual sided piston to travel within a space that is largely outside of the mold plates. This allows the piston seals to operate in lower thermal environments than they might otherwise experience because they are more remote from thermal sources in other mold parts thus lessening damaging high temperature effects.

Throughout the system, judicious use of air gaps is made to provide thermal barriers to isolate thermally sensitive features from high temperature sources and their damaging effects.

The geometry of the dual sided annular piston is preferably minimized in overall height while maximizing the size of its overall pressure surfaces to optimize the force to drive the gate pin while still residing within the industry standards for the size of a locating ring.

DETAILED DESCRIPTION OF THE DRAWINGS

The structure, operation, and methodology of the invention, together with other objects and advantages thereof, may best be understood by reading the detailed description to follow in connection with the drawings in which each part has an assigned label and/or numeral that identifies it wherever it appears throughout the various figures where:

DETAILED DESCRIPTION

This invention generally relates to injection molding technology and, more particularly, to the design of an in-line single nozzle valve gate apparatus.

Figure 1:
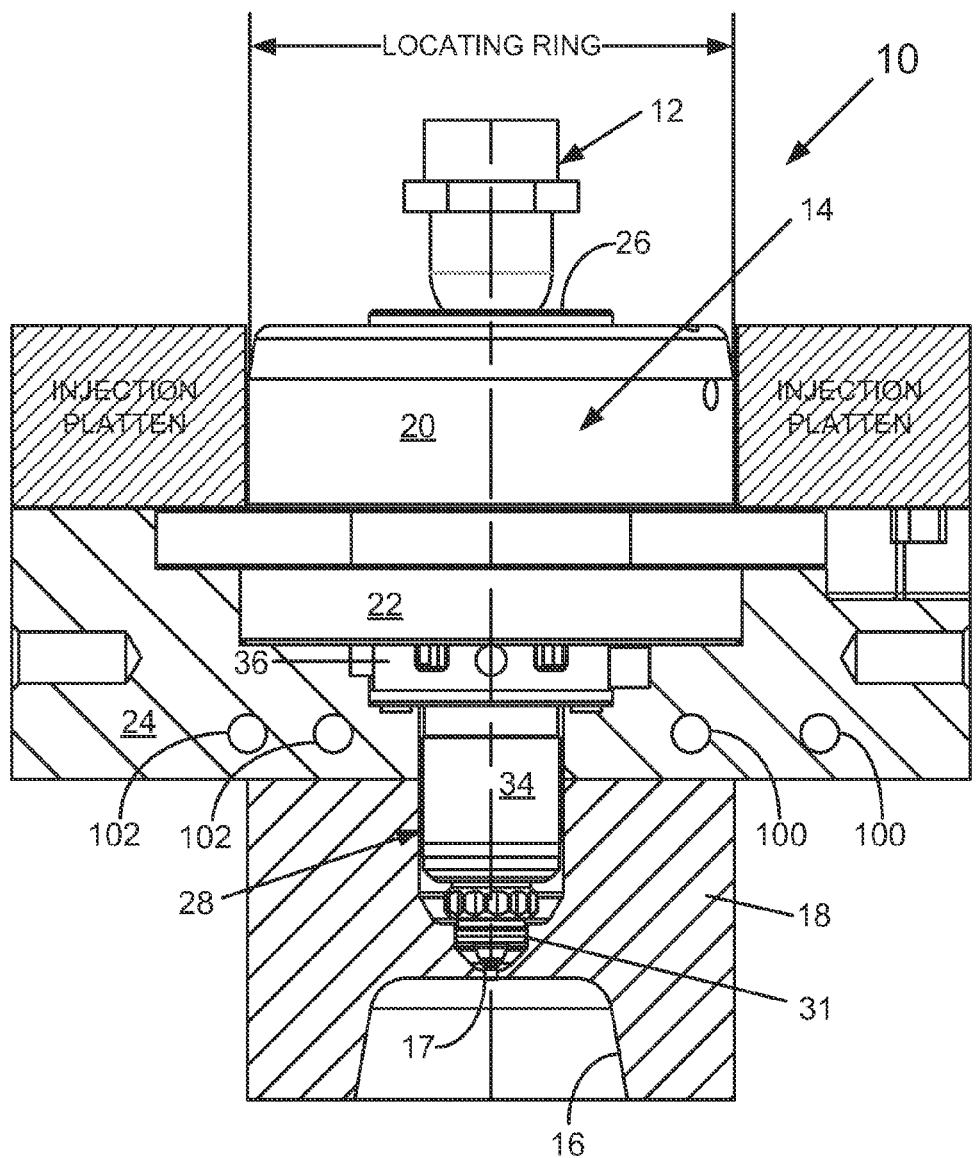
FIG. 1 is a diagrammatic partially sectional elevational view showing an in-line single nozzle valve gate in accordance with the invention utilized within various plates of a mold.

Referring now to FIG. 1, there is shown a plastic injection mold system designated generally at 10. Injection molding system 10 is used to manufacture parts from plastic in a well-known manner. During the manufacturing process, plastic pellets are placed in a large hopper which then feeds the pellets into a heated chamber where the pellets are melted into a flowable state. Afterwards, the melted plastic is injected into a molding system. Injection is achieved via an injection machine screw that is advanced by a drive unit and injection cylinder through an injection machine nozzle 12. Then, the melted plastic travels to a single nozzle valve gate apparatus generally designated at 14. The single nozzle valve gate apparatus 14 is in accordance with the invention. The pressurized plastic melt travels through the nozzle apparatus 14 in a manner to be described, eventually exiting it, to fill a gated part cavity 16 formed in the mold "B" plate, here designated at 18.

As seen in FIG. 1, apparatus 14 resides in the various mold plates comprising an injection machine platen, an "A" plate 24, and the "B" plate 18 already mentioned. The major parts of apparatus 14, as seen in FIG. 1, comprise an upper annular cylinder body 20, a lower annular cylinder body 22, a hot sprue bushing 28, and an injection nozzle interface 26.

Figure 2:
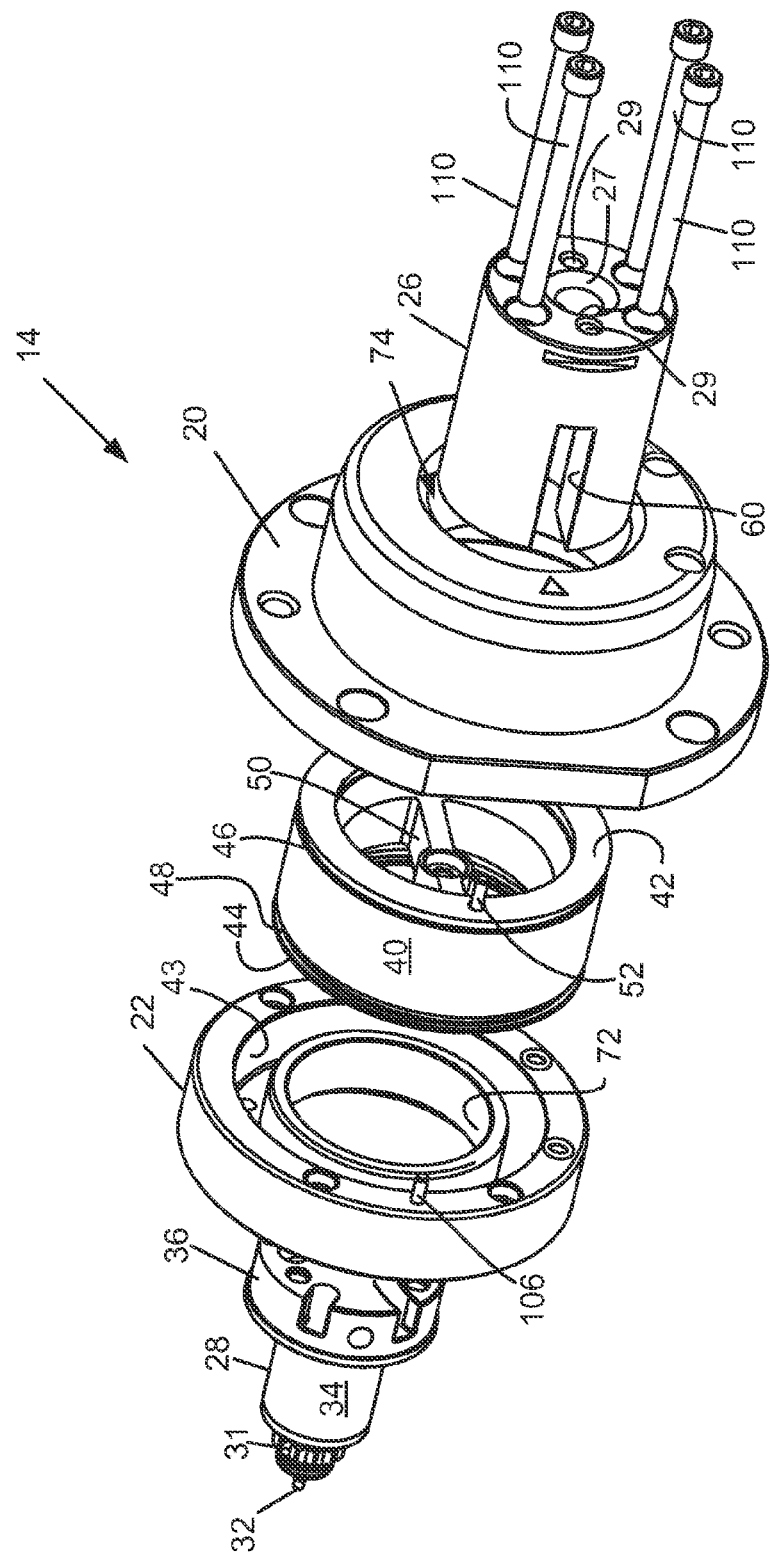
FIG. 2 is a diagrammatic exploded perspective view of the single nozzle valve gate of FIG. 1.
Figure 3:
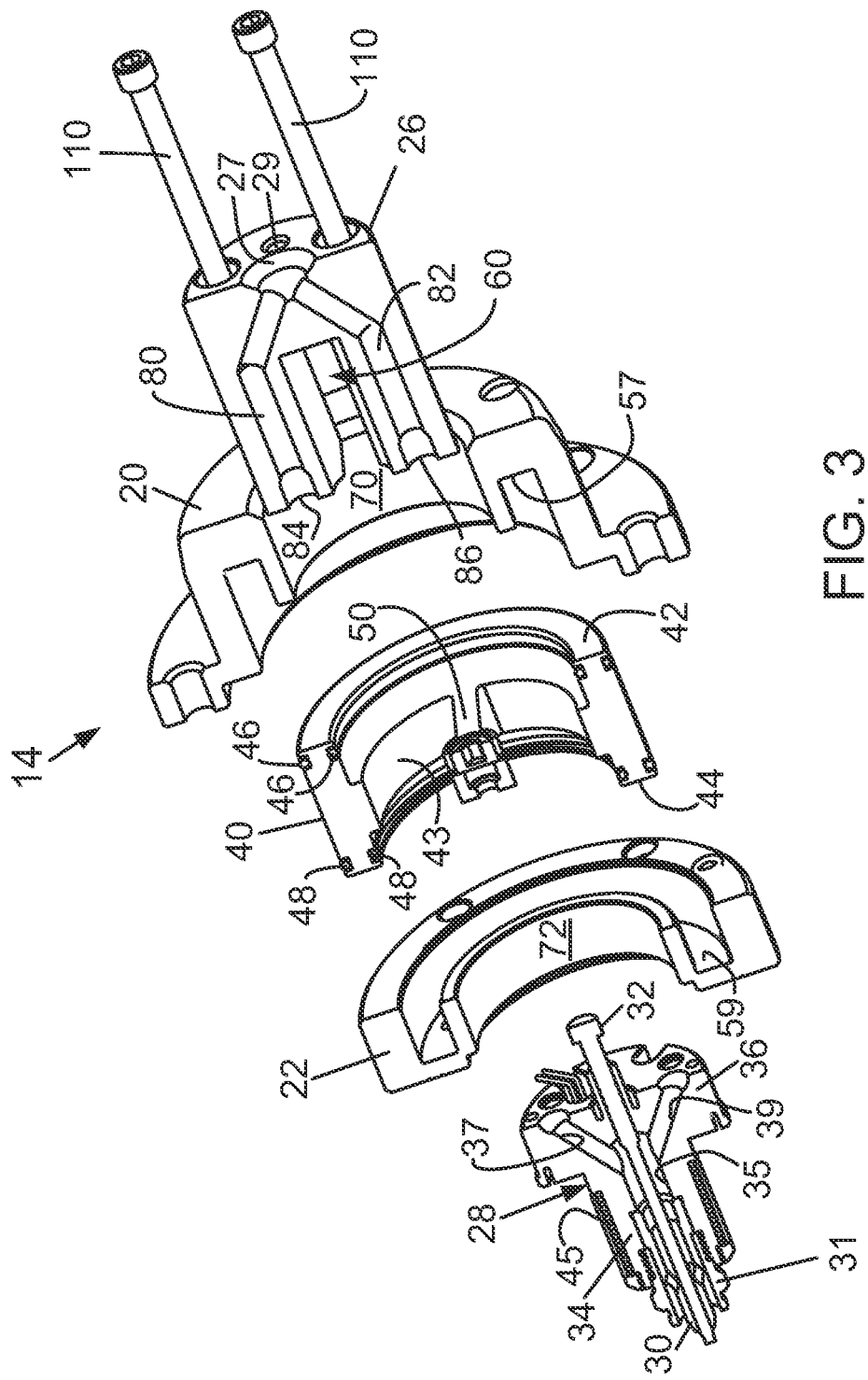
FIG. 3 is a diagrammatic exploded perspective view of the single nozzle valve gate of FIG. 2 from a different perspective and sectioned in half.
Figure 4:
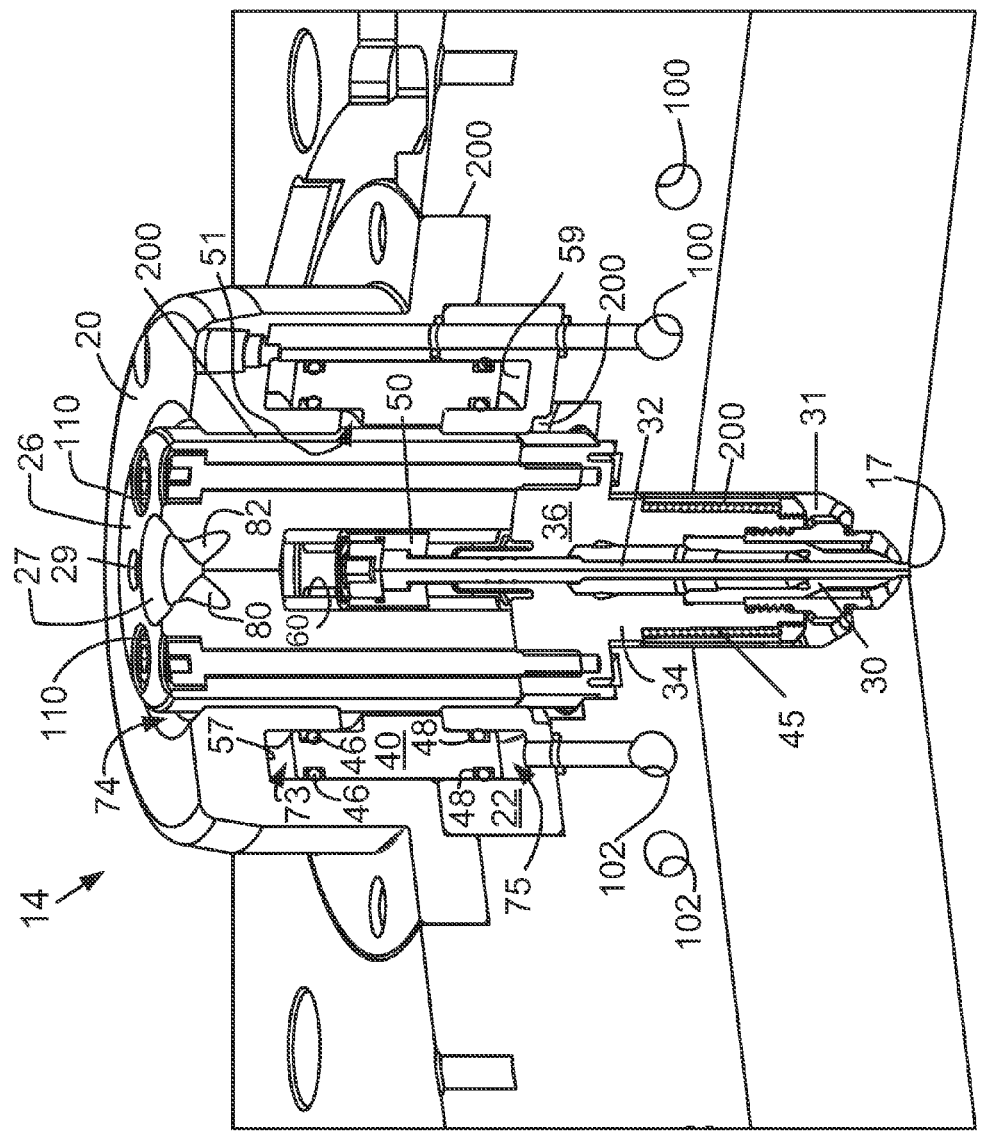
FIG. 4 is a diagrammatic perspective sectioned elevational view of the single nozzle valve gate of FIG. 1 along with various mold plates which are also shown in section.

Referring now to FIGS. 2, 3, and 4, upper and lower annular cylinder bodies, 20 and 22, respectively, are configured to mate together (See FIG. 4) to receive between them an annular dual sided piston 40 having opposed pressure bearing upper and lower surfaces, 42 and 44, respectively (FIG. 3). When mated, the inner circumferential surfaces of upper and lower cylinder bodies, 20 and 22, designated at 70 and 72, respectively (See FIGS. 2 and 3) define a through hole 74 (See FIGS. 2 and 4) that is bridged by a cross beam 50 that extends from one side to another of an inner circumferential surface 43 (FIG. 3) of piston 40 at a height approximately midway between its opposed upper and lower pressure bearing surfaces, 42 and 44.

Extending through the central hole 74 is the injection machine interface 26 (FIG. 4). The injection machine interface 26 has the general from of a cylinder. The top of the cylindrical injection machine interface 26 is provided with a curved seal 27 in the form of a concave spherical cap to mate with the corresponding shape of the injection machine nozzle 12 from which it receives pressurized molten plastic from the injection machine. The bottom of the cylindrical interface 26 is provided with a centrally located clearance groove 60 that extends vertically to provide space for receiving the cross beam 50 so that it can freely move up and down within groove 60. Injection machine interface 26 is also heated via preferably by four heater cartridges two of which are designated generally at 29.

As best seen in FIG. 3, the machine interface seal 27 has at least one, but preferably two, flow paths 80 and 82 that are angled so as to extend outwardly and downwardly to travel around the cross beam groove 60 (FIG. 2) where they terminate as spaced apart holes 84 and 86, respectively, in the bottom surface of interface 27.

Apparatus 14 also includes an elongated heated sprue bushing 28 having a body 34 and a head 36. Elongated heated sprue bushing 28 is provided with a central flow path 35 extending vertically from head to tip. Head 36 sits atop the body 34 and has two angled flow paths 37 and 39 that communicate, respectively, with the two flow paths 80 and 82 via the holes 84 and 86 located in the bottom surface of the injection machine interface 26. Molten pressurized plastic is received in the hot sprue bushing flow paths 37 and 39 to enter the sprue bushing's central flow path 35 at the end of which is a removable tip 30 having a flow aperture that mates with the cavity gate 17. Tip 30 is held in place via a retention nut 31.

Extending vertically trough the hot sprue bushing central flow path 35 is a valve gate pin 32 having an upper end connected to the piston cross beam 50 and a lower end configured to open and close the cavity gate 17 to regulate the flow of molten plastic to the part cavity 16. A heater 45 surrounds body 34 to assure that plastic remains in a flowable state so that it can proceed to the cavity 16.

As best seen in FIGS. 3 and 4, piston 40 and upper and lower cylinder bodies, 20 and 22, respectively, are configured and arranged with respect to another so that head spaces. 73 and 75, respectively, are formed between the piston upper and lower pressure bearing surfaces, 42 and 44, respectively, and corresponding upper lower internal pressure bearing surfaces. 57 and 59, located, respectively, in the upper and lower cylinder bodies 20 and 22. The head spaces, 73 and 75, are provided with seals in the form of O-rings 46 and 48, respectively.

Ports 100 and 102 (FIG. 4) are connected to pressurized air sources (or other suitable fluid) to controllably cause the piston 40 to move up and down so that the gate pin 32 in turn opens and closes the cavity gate 17.

The geometry of the upper cylinder body 20 is shaped to act as the locating ring for the apparatus 14 to align its various parts with the nozzle 12 of the injection molding machine while also permitting the annular dual sided piston 40 to travel within a space that is largely outside of the mold plates thus distancing the piston 40 from thermal sources in other mold parts whereby the piston seals ("O" rings 46 and 48) operate in lower thermal environments that might otherwise not exist. In this manner, the piston seals are protected from damaging high temperature effects.

Throughout the system, judicious use of air gaps is made to provide thermal barriers to isolate thermally sensitive features from high temperature effects. The air gaps are designated generally at 200 in FIG. 4 and are made wide enough to effectively act as thermal insulators, keeping heat where it is needed while preventing it from traveling to parts that might be damaged from otherwise higher temperatures.

The geometry of the dual sided annular piston 40 is preferably minimized in overall height while the size of its overall pressure bearing surfaces 42 and 44 are maximized to optimize the available force to drive gate pin 32 while still residing within the industry standards for the size of a locating ring. With this arrangement, pin forces of 400 pounds are possible, but it will be recognized that this geometry can be appropriately scaled as needed.

It should also be noted that the inner circumferential surfaces 70 and 72 of upper and lower cylindrical bodies 20 and 22 are of different heights so that an annular clearance groove 51 is provided to allow cross beam 50 to travel up and down.

To assemble apparatus 14, piston 40 is first placed within upper and lower cylindrical bodies 20 and 22 which are guided with locating pins 52 and 106 (FIG. 2). Afterwards, interface 26 is placed in the apparatus 14 to that its groove 60 travels around cross beam 50 and seats against the top surface of heated sprue bushing head 36. Afterward, bolts 110 are used to hold all of the parts of apparatus 12 together.

As can be appreciated, the inventive single nozzle valve gate apparatus is compact and mechanically reliable because it uses but few components and confines activation within the mold locating ring. Also, all components move in an in-line action which greatly reduces wear. Changing nozzles is also easy to that the apparatus can be used for a variety of applications.

Having set forth the invention by describing specific embodiments, others variants will be apparent to those skilled in the relevant art given the teachings of the and such other variants are intended to be within the scope of its teachings and claims.

What I claim is:

1. A single nozzle valve gate apparatus for use in a mold to convey molten plastic directly from an injection machine nozzle to a cavity formed within the mold, said apparatus comprising:

a cylinder housing comprising upper and lower cylinder bodies structured to mate with one another to provide a pair of spaced apart interior annular cylinder spaces that face one another and an interior vertically extending through hole, said upper cylinder body having an outside diameter and height such that said upper cylinder body, including the upper one of said pair of spaced apart interior annular cylinder spaces, resides outside of a mold plate and serves as a ring for directly locating said valve gate apparatus with respect to the injection machine nozzle, said spaced apart interior annular cylinder spaces having ports for pressurization and depressurization of said spaced apart interior annular cylinder spaces;

an annular dual sided piston having opposed pressure bearing upper and lower surfaces that fit respectively into said spaced apart upper and lower interior annular cylinder spaces, said annular dual sided piston having a cross beam that extends between the inner surfaces of said annular dual sided piston at approximately midway between its opposed upper and lower pressure bearing surfaces;

a sprue bushing having a head and an elongated body having a tip, said sprue bushing having a central through bore extending from said head to said tip, said central through bore being at least in part for transporting molten plastic to said tip, said head having at least one angled flow path running between said head and said central through bore;

an injection machine interface body for receiving molten plastic from the nozzle of the injection machine and transporting said molten plastic to said sprue bushing angled flow path after which said molten plastic enters said central through bore for travel to said tip; and a valve gate pin connected to said piston cross beam extending therefrom to said sprue bushing tip, said valve gate pin moving up and down with the motion of said piston in response to said annular spaced apart cylinder spaces being selectively pressurized and depressurized.

2. The single nozzle valve gate apparatus of claim 1 wherein said injection machine interface body has an recessed groove for receiving said cross beam such that said cross beam can travel up and down therein.

3. The single nozzle valve gate apparatus of claim 2 having an initial opening for receiving molten plastic from the injection molding machine nozzle and a dual flow path beginning at said initial opening and traveling around said recessed groove for directing molten plastic to said head of said sprue bushing.

4. The single nozzle valve gate apparatus of claim 1 wherein said annular dual sided piston includes O-rings for sealing said opposed pressure bearing upper and lower surfaces for travel in their respective spaced apart upper and lower interior annular cylinder spaces.

5. The single nozzle valve gate apparatus of claim 4 wherein the geometry of the upper cylinder body is shaped to locate said annular dual sided piston for travel within a space that is largely outside of the mold plates whereby said annular dual sided piston is distanced from thermal sources within other mold parts that potentially could damage said annular dual sided piston O-ring seals.

6. The single nozzle valve gate apparatus of claim 5 wherein air gaps are formed between said upper and lower cylinder spaces and said injection molding nozzle interface to further thermally isolate said annular dual sided piston O-ring seals from damaging high temperature effects.

7. The single nozzle valve gate apparatus of claim 5 further including heaters surrounding said elongated body of said sprue bushing to heat said central through bore.

8. A single nozzle valve gate apparatus for use in a mold to convey molten plastic directly from an injection machine nozzle to a cavity formed within the mold, said apparatus comprising:
- a cylinder housing consisting essentially of upper and lower cylinder bodies structured to mate with one another to provide a pair of spaced apart interior annular cylinder spaces that face one another and an interior vertically extending through hole, said upper cylinder body having an outside diameter and height such that said upper cylinder body, including the upper one of said pair of spaced apart interior annular cylinder spaces, resides outside of a mold plate and serves as a ring for directly locating said valve gate apparatus with respect to the injection machine nozzle, said spaced apart interior annular cylinder spaces having ports for pressurization and depressurization of said spaced apart interior annular cylinder spaces;
- an annular dual sided piston having opposed pressure bearing upper and lower surfaces that fit respectively into said spaced apart upper and lower interior annular cylinder spaces, said annular dual sided piston having a cross beam that extends between said inner surfaces of said annular dual sided piston at approximately midway between said opposed upper and lower pressure bearing surfaces;
- an injection machine interface body for receiving molten plastic directly from the nozzle of the injection machine and transporting said plastic further downstream; and
- a valve gate pin connected to said piston cross beam, said valve gate pin moving up and down with the motion of said piston in response to said annular spaced apart cylinder spaces being selectively pressurized and depressurized.

\* \* \* \* \*